United States Patent [19]

Matsufuji et al.

[11] 4,379,809
[45] Apr. 12, 1983

[54] MAGNETIC RECORDING MEDIUM

[75] Inventors: Akihiro Matsufuji; Tadashi Ishiguro; Nobuo Tsuji, all of Odawara, Japan

[73] Assignee: Fuji Photo Film Co., Ltd., Kanagawa, Japan

[21] Appl. No.: 307,691

[22] Filed: Sep. 30, 1981

[30] Foreign Application Priority Data

Sep. 30, 1980 [JP] Japan ................... 55-136133

[51] Int. Cl.$^3$ .............................................. B32B 9/00
[52] U.S. Cl. ..................................... 428/470; 428/694; 428/900
[58] Field of Search ...................... 428/470, 900, 694; 427/128–132; 252/62.54

[56] References Cited

U.S. PATENT DOCUMENTS 3,860,451  1/1975  Starks .................... 428/900 X

Primary Examiner—Bernard D. Pianalto
Attorney, Agent, or Firm—Sughrue, Mion, Zinn, Macpeak & Seas

[57] ABSTRACT

A magnetic recording medium which comprises a non-magnetic support having thereon a magnetic recording layer comprising ferromagnetic particles dispersed in a binder, with the magnetic layer further containing an organoaluminum compound or with the surface of the ferromagnetic particles being treated with an organoaluminum compound.

6 Claims, No Drawings

MAGNETIC RECORDING MEDIUM

FIELD OF THE INVENTION

This invention relates to a magnetic recording medium and, more particularly, to an improved magnetic recording medium.

BACKGROUND OF THE INVENTION

Ferromagnetic materials which are used in conventional magnetic recording media such as audio tapes, video tapes, memory tapes, magnetic sheets and magnetic cards are, for example, fine particles of ferromagnetic iron oxide, cobalt ferrite, ferromagnetic chromium dioxide or fine ferromagnetic metal particles or a thin film of ferromagnetic metal. One of the modern magnetic recording systems that is attracting research attention is high-density recording of short-wave signals. This system requires a ferromagnetic material having magnetic properties suitable for high-density recording (e.g., higher coercive force and greater residual flux density), and a ferromagnetic metal material is considered to be the most promising. However, the higher the coercive force and/or the residual flux density of magnetic particles, the greater the interaction between the individual particles, thus making it difficult to form a uniform dispersion of the magnetic particles. When metallic alloy particles are used as ferromagnetic particles, they are easily oxidized in nature, and, therefore, the magnetic properties of alloyed metal ferromagnetic particles are more easily deteriorated with time than oxide-based magnetic particles.

SUMMARY OF THE INVENTION

An object of this invention is therefore to provide a magnetic recording medium having excellent magnetic properties.

Another object of this invention is to provide ferromagnetic particles having excellent magnetic properties.

A further object of this invention is to provide a process for producing a magnetic recording medium having excellent magnetic properties.

It has now been found that these objects are achieved by incorporating an organoaluminum compound in a magnetic layer containing ferromagnetic particles or by using ferromagnetic particles the surface of which has been treated with an organoaluminum compound.

DETAILED DESCRIPTION OF THE INVENTION

The organoaluminum compound incorporated in the magnetic layer of this invention is an aluminum alcoholate compound of the formula (I)

$$Al(OR)_3 \quad (I)$$

or aluminum chelate compound of the formula (II)

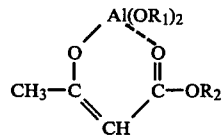

(II)

In the formula (I), each R, which may be the same or different, represents a straight or branched chain alkyl group having 1 to 10 carbon atoms, such as a methyl group, an ethyl group, a propyl group, a butyl group, a pentyl group, a hexyl group, a heptyl group, an octyl group, a nonyl group or a decyl group.

In the formula (II), $R_1$ is a straight or branched chain alkyl group having 1 to 10 carbon atoms, such as a methyl group, an ethyl group, a propyl group, a butyl group, a pentyl group, a hexyl group, a heptyl group, an octyl group, a nonyl group or a decyl group; $R_2$ is a straight or branched chain alkyl or alkenyl group having up to 20 carbon atoms, such as a methyl group, an ethyl group, a propyl group, a butyl group, a pentyl group, a hexyl group, a heptyl group, an octyl group a nonyl group, a decyl group, an undecyl group, a dodecyl group, a tridecyl group, an octadecyl group, a pentadecyl group, a hexadecyl group, a heptadecyl group, an octadecyl group, a nonadecyl group, an eicosyl group, a vinyl group, an allyl group, a butenyl group, a hexenyl group or an oleyl group, with an alkyl or alkenyl group having 8 to 20 carbon atoms being preferred.

These organoaluminum compounds are commercially available and can be used alone or in combination.

To obtain an optimum effect in this invention and to prevent side reaction between the ferromagnetic particles and active groups in the binder, the surface of ferromagnetic particles is preferably treated with the organoaluminum compound. In one embodiment of surface treatment, a slurry is formed by immersing ferromagnetic particles in an organic solvent having an organoaluminum compound dissolved therein, and then the solvent is removed from the resulting slurry by filtration or by distillation under reduced pressure.

Examples of organic solvents which can be used in the above surface treatment are aliphatic hydrocarbons such as n-hexane, cyclohexane and the like, aromatic hydrocarbons such as toluene, xylene and the like, ketones such as acetone, methyl ethyl ketone, methyl butyl ketone and the like, esters such as ethyl acetate, butyl acetate, methyl cellosolve acetate and the like, and ethers such as ethyl ether, tetrahydrofuran, dioxane and the like.

The particle size of ferromagnetic particles to be treated with a solution of an organoaluminum compound is not critical.

The concentration of organoaluminum compound in an organic solvent is preferably in the range of from about 0.1% to about 10% by weight.

In the above treatment, the percent coating is about 0.01 to about 100%, preferably 0.1 to 10%, with respect to B.E.T. coating area.

In this manner, substantially all aluminum contained in the solution of organoaluminum compound is coupled with ferromagnetic particles and the resulting slurry may be further combined with a binder, without removing the solvent used and drying the resulting ferromagnetic particles, to prepare a magnetic coating composition if the solvent used for the solution of organoaluminum compound is suitable for the binder and other additives to be added.

The organoaluminum compound can be used in an amount of about 0.01 to about 20%, preferably 0.1 to 10%, by weight relative to the amount of the ferromagnetic particles in either the embodiment where the ferromagnetic particles are treated with the solution of organoaluminum compound or where the organoaluminum compound is incorporated into the magnetic layer.

The magnetic layer of the magnetic recording medium according to this invention primarily comprises ferromagnetic particles and a binder. The magnetic layer can be prepared by thoroughly stirring a coating solution containing the ferromagnetic particles, binders, coating solvents, dispersants, lubricants, abrasives, antistatic agents, etc. to form a uniform dispersion, and applying the dispersion onto a non-magnetic support, followed by subjecting the applied dispersion to orientation, drying the calendering steps.

The binder which can be used in this invention can be a conventional thermoplastic resin, thermosetting resin or reactive resin or a mixture of these resins. Examples of suitable thermoplastic resins are vinyl chloride-vinyl acetate copolymer, vinyl chloride-vinylidene chloride copolymer, vinylidene chloride-acrylonitrile copolymer, vinyl chloride-acrylonitrile copolymer, (meth)acrylic acid ester-acrylonitrile copolymer, (meth)acrylic acid ester-vinylidene copolymer, (meth)acrylic acid ester-styrene copolymer, urethane elastomer, urethane resin, polyvinyl fluoride, butadiene-acrylonitrile copolymer, polyamide resin, polyvinyl acetal resin, cellulose derivative (e.g., cellulose acetate, cellulose butyrate, cellulose diacetate, cellulose triacetate, cellulose propionate, cellulose acetate propionate, nitrocellulose, etc.), styrene-butadiene copolymer, and polyester resin, etc. A thermosetting or reactive resin is one that, upon heating or exposure to light, undergoes condensation or addition reactions to increase its molecular weight infinitely. Examples of such resins are phenolic resin, epoxy resin, polyurethane hardening resin, urea resin, melamine resin, unsaturated polyester resin and acrylic acid ester resin, etc. These resins may contain a polyisocyanate compound as a cross-linking agent to improve durability.

These binders can be used alone or in combination. The binder can be used in an amount of about 8 to 25 parts by weight per 100 parts by weight of the ferromagnetic particles.

Examples of ferromagnetic particles which can be used in this invention are an iron oxide-based ferromagnetic material such as gamma-$Fe_2O_3$, $Fe_3O_4$ or these iron oxides doped with other metals such as Co, Zn or the like; a chromium dioxide-based ferromagnetic material such as $CrO_2$ or $CrO_2$ doped with a metal element such as Li, Na, Sn, Pb, Fe, Co, Ni or Zn or a halogen atom; and a metallic magnetic material made of a metal such as Co, Fe or Ni or alloys thereof. The metallic magnetic material is particularly preferred in this invention since it has great saturation magnetization ($\sigma s$) and coercive force (Hc) and provides a magnetic recording medium suitable for high-density recording with a high signal-to-noise (S/N) ratio.

There is no particular limitation on the method for preparing the fine ferromagnetic metal particles used in this invention. Several representative examples are listed below:

(1) an organic acid salt of a ferromagnetic metal is thermally decomposed and reduced with a reducing gas;
(2) an acicular oxyhydroxide or an acicular hydroxide containing a dissimilar metal or an acicular iron oxide derived from these oxyhydroxide is reduced;
(3) a ferromagnetic metal is evaporated in a low-pressure inert gas;
(4) a metal carbonyl compound is thermally decomposed;
(5) a ferromagnetic metal powder is electrodeposited on a mercury cathode and then separated from the mercury; and
(6) a salt of a metal capable of forming a ferromagnetic material is dissolved in water and reduced with a reducing substance (e.g., a borohydride compound, a hypophosphite or hydrazine) to form a ferromagnetic powder.

The surface of the ferromagnetic metal particles may be provided with an oxide coating to improve their chemical stability.

Examples of solvents which can be used for a magnetic coating composition are organic solvents including ketones such as methyl ethyl ketone and cyclohexanone; alcohols; such as ethanol, propanol and butanol; esters such as ethyl acetate and butyl acetate; aromatic solvents such as toluene; Cellosolves such as ethyl cellosolve acetate and methyl cellosolve acetate; ethers such as diethyl ether, tetrahydrofuran and dioxane; and chlorinated hydrocarbon solvents such as carbon tetrachloride and chloroform.

Examples of lubricants which can be used are silicone oils such as polysiloxanes; inorganic particles such as graphite and molybdenum disulfide; fine synthetic resin particles such as polyethylene and polytetrafluoroethylene; higher aliphatic acids; higher alcohols; higher aliphatic acid esters; and fluorocarbons. These lubricants can be used in an amount of about 0.1 to 20 parts by weight per 100 parts by weight of the binder.

Examples of abrasives are fine particles of fused alumina, silicon carbide, chromium oxide ($Cr_2O_3$), corundum and diamond whose average size is in the range of from 0.05 to 5$\mu$. These abrasives can be used in an amount of about 0.5 to 20 parts by weight per 100 parts by weight of the binder.

Examples of antistatic agents include electrically conductive particles such as graphite, carbon black and carbon black-graft polymer; and nonionic, anionic and cationic surfactants. These antistatic agents can be used in an amount of about 0.1 to 10 parts by weight per 100 parts by weight of the ferromagnetic particles.

Examples of non-magnetic supports which can be used are synthetic resins (e.g., polyester, polyamide, polyolefin, and cellulose derivatives), non-magnetic metals, glass, ceramic and paper. These supports can be used in the form of films, tapes, sheets, cards, discs, drums or other suitable forms.

The ferromagnetic particles, the organoaluminum compound, the dispersant, the lubricant, the abrasive, the antistatic agent and solvent described above, as well as any optional component, are mixed together to form a magnetic coating composition. All components may be fed into a mixer or the respective components may be charged into the mixer sequentially. Various types of mixer can be used for making the magnetic coating composition, and for details of the specific types, reference can be made to T. C. Patton, *Paint Flow and Pigment Dispersion,* John Wiley & Sons, (1964).

The magnetic coating composition can be applied onto the non-magnetic support by various methods, for example, using a procedure as described in *Coating Engineering,* Asakura Shoten, (1971).

The magnetic layer thus formed on the support is dried after it has been subjected to treatment for orienting the magnetic particles in the layer. If necessary, the layer is passed through a smoothing step to improve the magnetic properties (e.g., smoothing before drying or calendering after drying).

This invention is now described in greater detail by reference to the following examples and comparative examples which are given for illustrative purposes only and are by no means intended to limit the scope of the invention. In these examples, all parts are by weight, unless otherwise indicated.

EXAMPLE 1

Magnetic particles of gamma-$Fe_2O_3$ were immersed in a 1 wt% solution of lauryl acetoacetate aluminum diisopropylate in toluene. The mixture was stirred, allowed to stand overnight, filtered and dried. 300 parts of the resulting magnetic gamma-$Fe_2O_3$ particles and a composition having the following formulation were placed in a ball mill and thoroughly mixed.

Vinyl Chloride/Vinyl Acetate/Vinyl Alcohol Copolymer ("VAGH", produced by Union Carbide Corp.): 30 parts
Polyester Polyurethane ("Crisbon 7209", produced by Dainippon Ink & Chemicals Inc.): 20 parts
Carbon Black (average particle size: about 170 A): 20 parts
Dimethyl Polysiloxane (degree of polymerization=ca. 60): 6 parts
Butyl acetate: 500 parts
Methyl Isobutyl Ketone: 300 parts To the mixture was added 25 parts of a 75 wt% solution of a triisocyanate compound ("Desmodur L-75", produced by Bayer A.G.) in ethyl acetate, and the resulting mixture was stirred with a high-speed shear disperser for one hour to provide a magnetic coating composition.

The magnetic coating composition was applied onto a polyethylene terephthalate film and then placed in a magnetic field for orientation, dried, calendered, and slit into a magnetic tape of a predetermined width.

EXAMPLE 2

A magnetic tape was prepared using the same procedure as described in Example 1 except that the lauryl aceto-acetate aluminum diisopropylate was replaced by oleyl acetoacetate aluminum diisopropylate.

COMPARATIVE EXAMPLE 1

A magnetic tape was prepared using the same procedure as described in Example 1 except that the gamma-$Fe_2O_3$ magnetic particles were not treated with an organoaluminum compound.

EXAMPLE 3

A magnetic tape was prepared using the same procedure as described in Example 1 except that Co-coated gamma-$Fe_2O_3$ particles were used as magnetic particles.

EXAMPLE 4

A magnetic tape was prepared using the same procedure as described in Example 2 except theat Co-coated gamma-$Fe_2O_3$ particles were used as magnetic particles.

COMPARATIVE EXAMPLE 2

A magnetic tape was prepared using the same procedure as described in Comparative Example 1 except that Co-coated gamma-$Fe_2O_3$ particles were used as magnetic particles.

EXAMPLE 5

A magnetic tape was prepared using the same procedure as described in Example 1 except that ferromagnetic metal particles were used. The particles were produced by thermally decomposing acicular grains of alpha-FeOOH (5 wt% Co) and reducing the resulting alpha-$Fe_2O_3$ with hydrogen.

EXAMPLE 6

A magnetic tape was prepared using the same procedure as described in Example 2 except that ferromagnetic metal particles were used. The particles were produced by thermally decomposing acicular grains of alpha-FeOOH (5 wt% Co) and reducing the resulting alpha-$Fe_2O_3$ with hydrogen.

COMPARATIVE EXAMPLE 3

A magnetic tape was prepared using the same procedure as described in Comparative Example 1 except that ferromagnetic metal particles were used. The particles were produced by thermally decomposing acicular grains of alpha-FeOOH (5 wt% Co) and reducing the resulting alpha-$Fe_2O_3$ with hydrogen.

EXAMPLE 7

300 parts of the ferromagnetic metal particles produced by thermally decomposing acicular grains of alpha-FeOOH containing 5 wt% Co and reducing the resulting alpha-$Fe_2O_3$ were placed in a ball mill and thoroughly mixed with a composition having the following formulation.

Vinyl Chloride/Vinyl Acetate/Vinyl Alcohol Copolymer ("VAGH", produced by Union Carbide Corp.): 30 parts
Polyester Polyurethane ("Criston 7209", produced by Dainippon Ink & Chemicals Inc.): 20 parts
Oleyl Acetoacetate Aluminum Diisopropylate: 6 parts
Carbon Black (average particle size: about 170 A): 20 parts
Dimethyl Polysiloxane (degree of polymerization=ca. 60): 6 parts
Butyl Acetate: 500 parts
Methyl Isobutyl Ketone: 300 parts To the mixture was added 25 parts of a 75 wt% solution of a triisocyanate compound ("Desmodur L-75," produced by Bayer A.G.) in ethyl acetate, and the resulting mixture was stirred with a high-speed shear disperser for one hour to provide a magnetic coating composition.

The magnetic properties of the magnetic tape samples produced in Examples 1 to 7 and in Comparative Examples 1 to 3 were evaluated by a vibrating flux meter (Model VSM-III, product of Toei Kogyo K.K.). The results obtained are shown in Table 1 below.

TABLE 1

| Run No. | Magnetic Particles | Organoaluminum Compound | Squareness Ratio |
|---|---|---|---|
| Example 1 | $\gamma$-$Fe_2O_3$ | Lauryl acetoacetate aluminum diisopropylate | 0.85 |
| Example 2 | " | Oleyl acetoacetate aluminum diisopropylate | 0.84 |
| Comparative Example 1 | " | — | 0.83 |
| Example 3 | Co-coated $\gamma$-$Fe_2O_3$ | Lauryl acetoacetate aluminum diisopropylate | 0.86 |
| Example 4 | Co-coated $\gamma$-$Fe_2O_3$ | Oleyl acetoacetate aluminum diisopropylate | 0.86 |
| Comparative Example 2 | Co-coated $\gamma$-$Fe_2O_3$ | — | 0.84 |

TABLE 1-continued

| Run No. | Magnetic Particles | Organoaluminum Compound | Squareness Ratio |
|---|---|---|---|
| Example 5 | Ferromagnetic metal particles | Lauryl acetoacetate aluminum diisopropylate | 0.82 |
| Example 6 | Ferromagnetic metal particles | Oleyl acetoacetate aluminum diisopropylate | 0.82 |
| Comparative Example 3 | Ferromagnetic metal particles | — | 0.80 |
| Example 7 | Ferromagnetic metal particles | Oleyl acetoacetate aluminum diisopropylate | 0.82 |

The results shown in Table 1 above clearly indicated that the organoaluminum compound as defined in this invention is effective for improving the dispersibility of ferromagnetic particles.

EXAMPLES 8 TO 10

Acicular grains of alpha-FeOOH containing 5 wt% of Co were thermally decomposed and the resulting alpha-$Fe_2O_3$ was reduced with hydrogen to form ferromagnetic metal particles. The particles were immersed in a 1 wt% toluene solution of each of the organoaluminum compounds indicated in Table 2 below. After stirring, the mixtures were allowed to stand for one day, and then filtered and dried.

COMPARATIVE EXAMPLE 4

Metal particles as used in Examples 8 to 10 were treated as indicated above except that no aluminum compound was present in the toluene.

The magnetic particles obtained in Examples 8 to 10 and Comparative Example 4 were allowed to stand at 60° C. and 90% relative humidity for one week, and the decrease in their saturation magnetic flux ($\sigma s$) was measured with a vibrating flux meter (VSM-III). The results obtained are shown in Table 2 below.

TABLE 2

| Run No. | Organoaluminum Compound | Percent Reduction in Saturation Flux Density ($\sigma s$) |
|---|---|---|
| Example 8 | Lauryl acetoacetate aluminum diisopropylate | 11 |
| Example 9 | Oleyl acetoacetate aluminum diisopropylate | 15 |
| Example 10 | Aluminum triisopropylate | 10 |
| Comparative Example 4 | — | 25 |

As is clear from the results shown in Table 2 above, the organoaluminum compound specified in this invention is very effective for preventing the deterioration of ferromagnetic metal particles with time.

While the invention has been described in detail and with reference to specific embodiments thereof, it will be apparent to one skilled in the art that various changes and modifications can be made therein without departing from the spirit and scope thereof.

What is claimed is:

1. A magnetic recording medium which comprises a non-magnetic support having thereon a magnetic recording layer comprising ferromagnetic particles dispersed in a binder, with the surface of said ferromagnetic particles being treated with an aluminum alcoholate of the formula (I):

wherein each R, which may be the same or different, represents a straight or branched chain alkyl group having 1 to 10 carbon atoms.

2. A magnetic recording medium which comprises a non-magnetic support having thereon a magnetic recording layer comprising ferromagnetic particles dispersed in a binder, with the surface of said ferromagnetic particles being treated with an aluminum chelate compound of the formula (II):

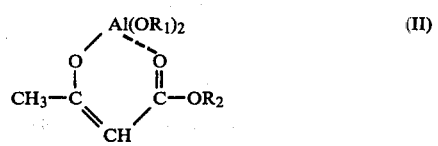

wherein $R_1$ is a straight or branched chain alkyl group having 1 to 10 carbon atoms, and $R_2$ is a straight or branched chain alkyl or alkenyl group having up to 20 carbon atoms.

3. A magnetic recording medium according to claim 1 or 2, wherein the ferromagnetic particles are particles of ferromagnetic iron oxide.

4. A magnetic recording medium according to claim 1 or 2, wherein the ferromagnetic particles are particles of cobalt ferrite.

5. A magnetic recording medium according to claim 1 or 2, wherein the ferromagnetic particles are particles of ferromagnetic chromium dioxide.

6. A magnetic recording medium according to claim 1 or 2, wherein the ferromagnetic particles are fine particles of ferromagnetic metals or alloys thereof.

* * * * *